US010473240B2

(12) United States Patent
Erkelens

(10) Patent No.: US 10,473,240 B2
(45) Date of Patent: Nov. 12, 2019

(54) HOSE MOUNTING ASSEMBLY

(71) Applicant: C&D ZODIAC, INC., Huntington Beach, CA (US)

(72) Inventor: Frans Erkelens, Huntington Beach, CA (US)

(73) Assignee: C&D ZODIAC, INC., Huntington Beach, CA (US)

( * ) Notice: Subject to any disclaimer, the term of this patent is extended or adjusted under 35 U.S.C. 154(b) by 0 days.

(21) Appl. No.: 15/908,651

(22) Filed: Feb. 28, 2018

(65) Prior Publication Data

US 2018/0252336 A1    Sep. 6, 2018

Related U.S. Application Data

(60) Provisional application No. 62/465,679, filed on Mar. 1, 2017, provisional application No. 62/548,808, filed on Aug. 22, 2017.

(51) Int. Cl.
*F16M 11/00* (2006.01)
*F16L 3/137* (2006.01)
*B64D 47/00* (2006.01)

(52) U.S. Cl.
CPC .............. *F16L 3/137* (2013.01); *B64D 47/00* (2013.01); *F16L 2201/00* (2013.01)

(58) Field of Classification Search
CPC ................................... F16L 3/233; H02G 3/30
See application file for complete search history.

(56) References Cited

U.S. PATENT DOCUMENTS

| 5,538,208 | A | 7/1996 | Cordes | |
|---|---|---|---|---|
| 2002/0084388 | A1* | 7/2002 | Geiger | F16L 3/233 248/74.3 |
| 2008/0078891 | A1 | 4/2008 | Hobson | |
| 2010/0096511 | A1 | 4/2010 | Olver | |
| 2013/0105639 | A1 | 5/2013 | Chirpich et al. | |
| 2014/0060891 | A1* | 3/2014 | Deshaies | H02G 3/30 174/163 R |

OTHER PUBLICATIONS

International Search Report and Written Opinion issued in PCT/US2018/020323.

* cited by examiner

*Primary Examiner* — Amy J. Sterling
(74) *Attorney, Agent, or Firm* — Jeffer Mangels; Butler & Mitchell LLP; Brennan C. Swain, Esq.

(57) ABSTRACT

A hose mounting assembly that includes a mounting member having a base and a main body portion. The main body portion includes first and second ends, a curved tie tunnel defined therethrough, and a curved mounting surface. The base includes a first connection opening defined therethrough.

15 Claims, 10 Drawing Sheets

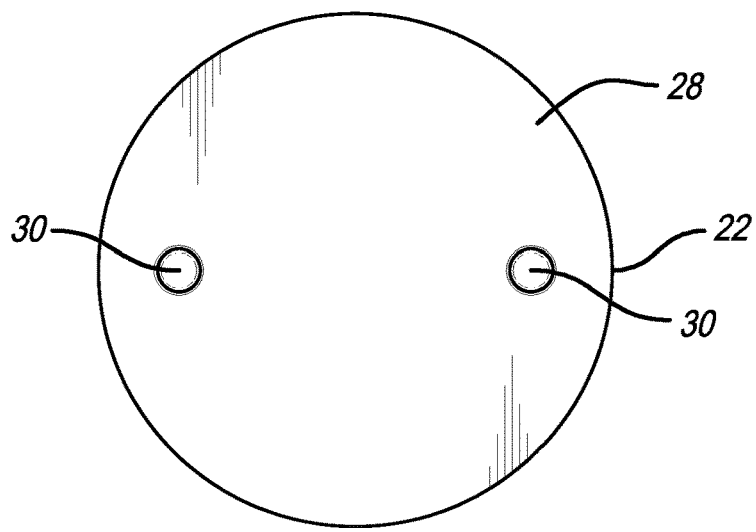
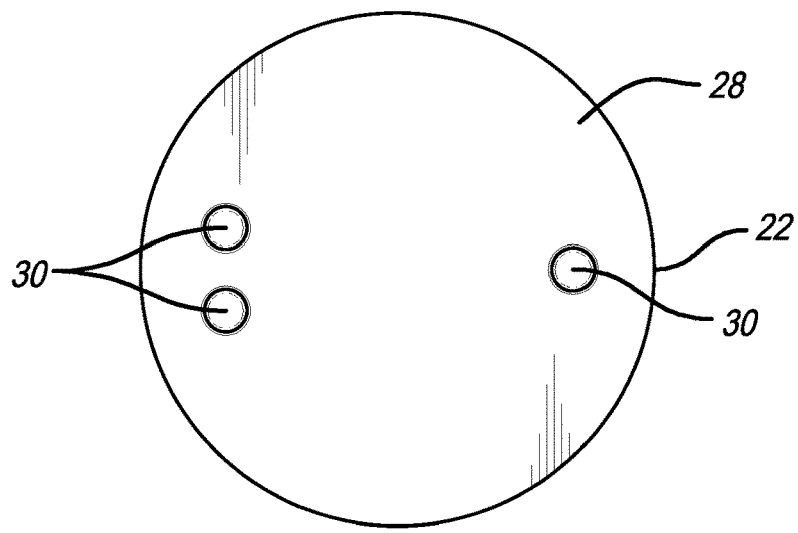
FIG. 8
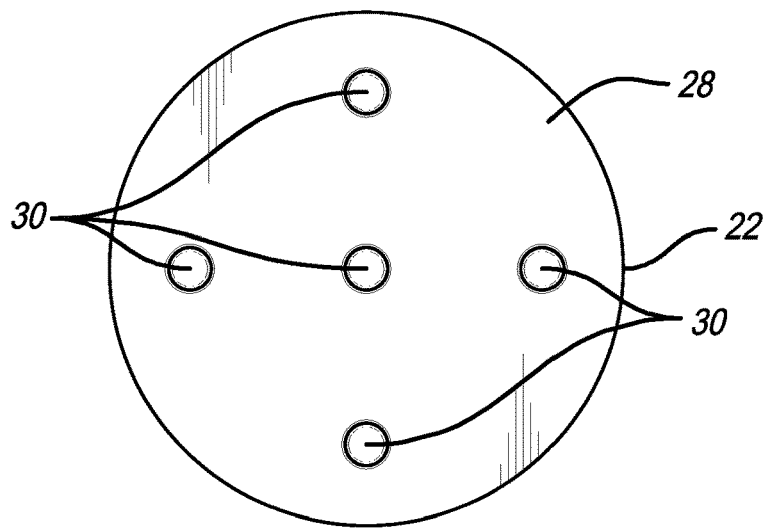

HOSE MOUNTING ASSEMBLY

CROSS REFERENCE TO RELATED APPLICATIONS

This application claims the benefit of U.S. Provisional Application No. 62/548,808, filed Aug. 22, 2017 and U.S. Provisional Application No. 62/465,679, filed Mar. 1, 2017, the entireties of which are incorporated herein by reference.

FIELD OF THE INVENTION

The present invention relates generally to an assembly for mounting hoses, and more particularly to an assembly for mounting hoses in a commercial aircraft.

BACKGROUND OF THE INVENTION

In mounting hoses in commercial aircraft, the prior art uses round spacers with a hollow core that allow for the mounting of hardware (screws or bolts) to a panel or other substrate. Typically atop the spacer are either electrical, plumbing or air hose clamps. These clamps can be a variety of different materials, types or constructions. Build-up requires multiple pieces of hardware, such as screws, washers, clamps and inserts which are bonded into the panel or other substrates.

SUMMARY OF THE PREFERRED EMBODIMENTS

In accordance with a first aspect of the present invention there is provided a hose mounting assembly that includes a mounting member having a base and a main body portion. The main body portion includes first and second ends, a curved tie tunnel defined therethrough, and a curved mounting surface. The base includes a first connection opening defined therethrough. In a preferred embodiment, the main body portion includes a second connection opening defined therethrough that is coaxial with the first connection opening, such that a connection path is defined from the mounting surface, through the main body portion, through the base and through a bottom surface of the base. Preferably, the mounting surface includes mounting guides thereon.

In a preferred embodiment, the tie tunnel extends from a first end opening in the first end to a second end opening in the second end. Preferably, the main body portion includes first and second tie openings defined therein that communicate the tie tunnel with the mounting surface. A first tie path is defined in through the first end opening, through the tie tunnel and out through the second end opening and a second tie path is defined in through the first tie opening, through a portion of the tie tunnel and out through the second tie opening.

In a preferred embodiment, the assembly includes a spacer member that includes a base and an extension portion having first and second ends. The base of the mounting member is secured to the first end of the extension portion. Preferably, the first end of the extension portion includes a mounting opening defined therein that is coaxial with the first connection opening, and a fastener is received in the first connection opening and the mounting opening to secure the mounting member to the spacer member. In a preferred embodiment, the first end of the extension portion includes one of a first protrusion and a first recess and the base of the mounting member includes the other of the first protrusion and the first recess, and wherein the first protrusion is received in the first recess. Preferably, the first recess is defined in the first end of the extension portion and the first recess is part of an elongated channel defined longitudinally in the extension portion.

In a preferred embodiment, the base of the spacer member includes at least a first alignment protrusion extending from a bottom surface thereof. Preferably, the base of the spacer member includes at least a first installation guide protrusion on an upper surface thereof. The extension portion defines a longitudinal central axis and the first installation guide protrusion is coaxial with the first alignment protrusion along an axis that is parallel to the longitudinal central axis.

In accordance with another aspect of the present invention there is provided a hose mounting assembly that includes a mounting member, a spacer member and a tie member. The mounting member has a base and a main body portion. The main body portion includes first and second ends, a curved tie tunnel defined therethrough, and a curved mounting surface. The base includes a first connection opening defined therethrough. The spacer member includes a base and an extension portion having first and second ends. The base of the mounting member is secured to the first end of the extension portion. The tie member extends through at least a portion of the tie tunnel. The tie member has first and second ends that are connected to one another outside of the tie tunnel.

The present invention is a hose mounting assembly that can be used on aircraft interior monuments to mount clamps or hoses. The mounting assembly includes a spacer member that can be bonded or adhered to a panel or other component and a mounting member for attaching a hose thereto using a zip-tie or the like. Compared to the prior art, the present invention reduces installation time by having assembly pre-mounted onto the panel and reduces the number of parts needed. The mounting member can be mounted directly to the panel. The guide pin configuration or protrusions help reduce installation error. Also, the spacer member and mounting member are preferably interchangeable with other spacer members and mounting members.

In a preferred embodiment, spacers at various standardized heights (0.25", 0.50", 0.75", 1.00", 1.25", 1.50") can be bonded directly to any substrate material and have an integrated threaded insert that allows for the mounting of a mounting member. The bonded spacer design is such that it can receive the clamping base for a variety of different hose diameters (e.g., ranges 1.00"-1.50", 1.75"-2.25", 2.50"-3.25", 3.50"-4.00", 1.25"-4.75"). Preferably, the spacers have a unique mounting pattern per size or height which facilitates the assembly line worker to always install the correct spacer in the proper location and with the correct orientation. The spacers eliminate the need for hardware like loose screws, washers, and inserts (although these components can still be used, if necessary). The clamping system eliminates the need for expensive metallic clamps, instead the hoses can be mounted on the "cradles" or mounting members using a zip-tie or other tie device (e.g., hose clamp, rope, string, band, etc.

BRIEF DESCRIPTION OF THE DRAWINGS

The invention may be more readily understood by referring to the accompanying drawings in which:

FIG. 8 is a bottom plan view of a series of spacer members showing different alignment member orientations.

Like numerals refer to like parts throughout the several views of the drawings.

DETAILED DESCRIPTION OF THE PREFERRED EMBODIMENTS

Figure 1:
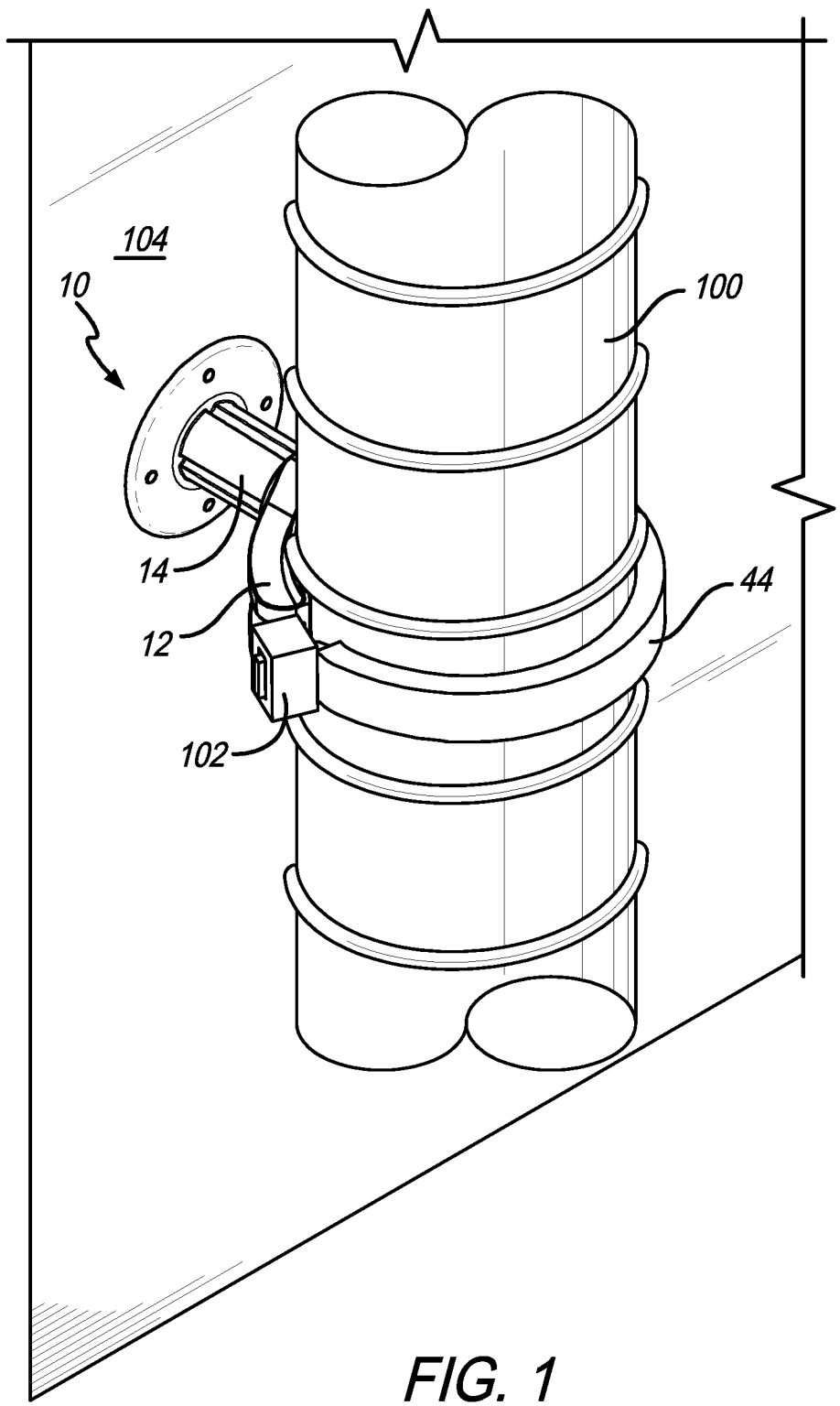
FIG. 1 is a perspective view of a hose mounting assembly with a hose mounted therein and attached to a panel in accordance with a preferred embodiment of the present invention.
Figure 2:
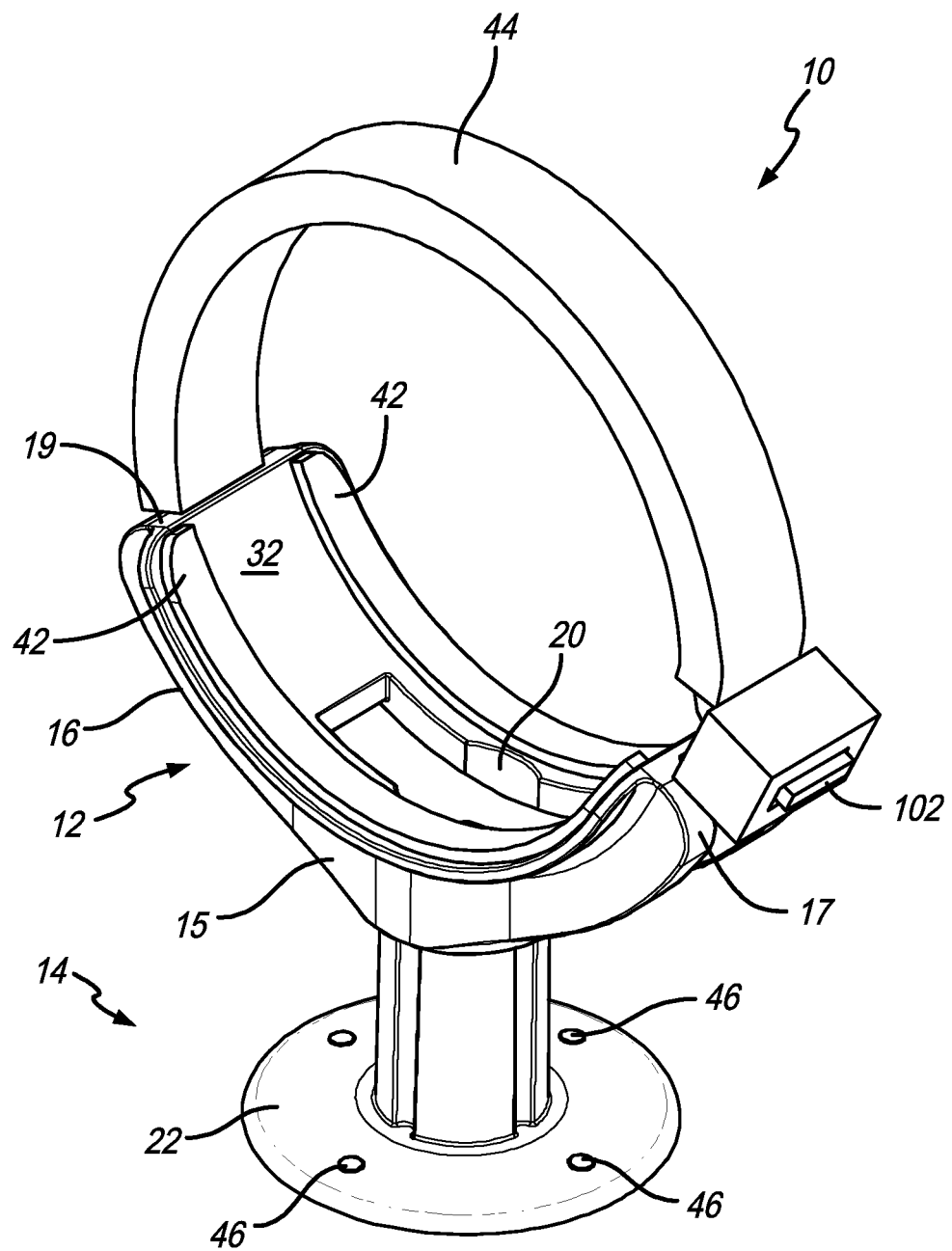
FIG. 2 is a perspective view of the hose mounting assembly of FIG. 1.
Figure 3:
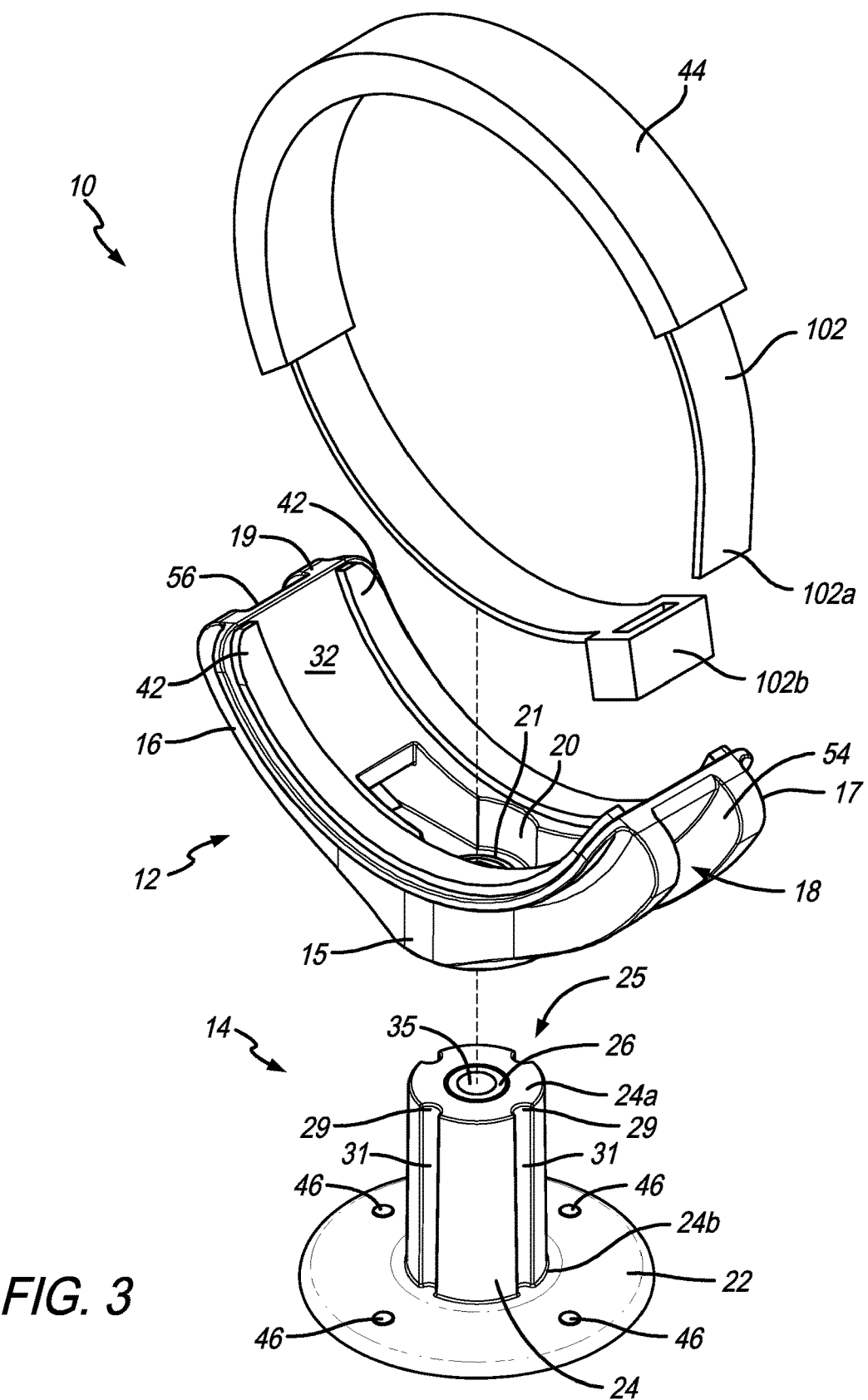
FIG. 3 is an exploded perspective view of the hose mounting assembly of FIG. 1.
Figure 4:
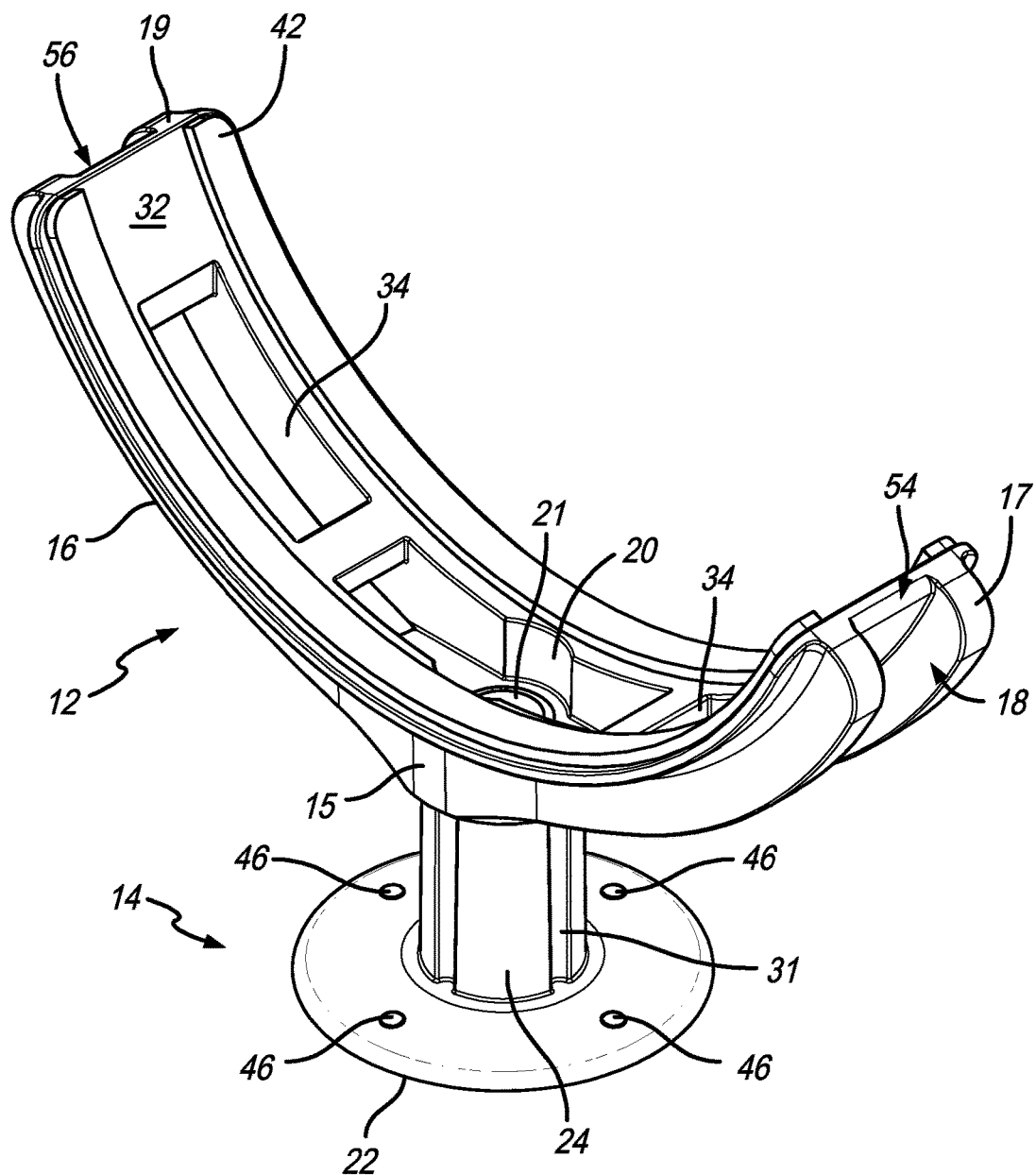
FIG. 4 is a perspective view of another hose mounting assembly.

The following description and drawings are illustrative and are not to be construed as limiting. Numerous specific details are described to provide a thorough understanding of the disclosure. However, in certain instances, well-known or conventional details are not described in order to avoid obscuring the description. References to one or another embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. Appearances of the phrase "in one embodiment" in various places in the specification do not necessarily refer to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein. Nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," and "below" used herein are merely for ease of description and refer to the orientation of the components as shown in the figures. It should be understood that any orientation of the components described herein is within the scope of the present invention. It will be appreciated that the use of dimensions and other numerical measurements are only exemplary and are not limiting.

Referring now to the drawings, wherein the showings are for purposes of illustrating the present invention and not for purposes of limiting the same, FIGS. 1-9 show preferred embodiments of the present invention, which is directed to a hose mounting assembly 10 that generally includes a mounting member 12 and a spacer member 14. As shown in FIG. 1, the mounting assembly 10 is used to secure a hose 100 to a panel 104 using a zip tie or tie member 102

As is best shown in FIGS. 2-5B, the mounting member 12 generally includes a base 15 and a main body portion 16 having a semi-circular or arcuate shape. As discussed further below, the tie tunnel 18 is configured to receive a tie member 102 (e.g., a zip tie, hose clamp, cord, rope, etc.) therethrough. The main body portion 16 includes a curved tie tunnel 18 extending therethrough, first and second ends 17 and 19 and a curved mounting surface 32. The base 15 includes a first connection opening 21 and the main body portion includes a second connection opening 20 defined therethrough.

Figure 6A:
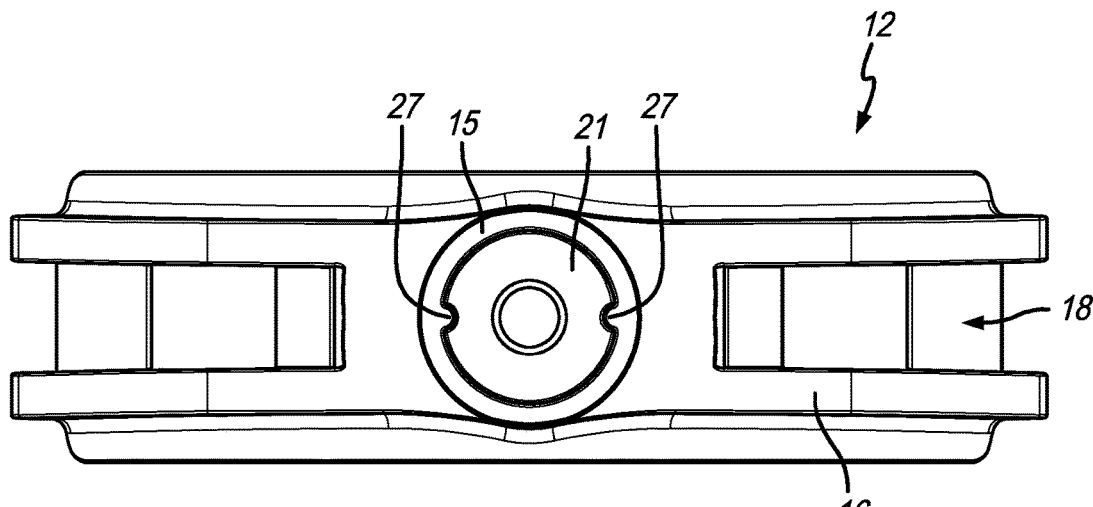
FIG. 6A is a bottom plan view of a mounting member.
Figure 6B:
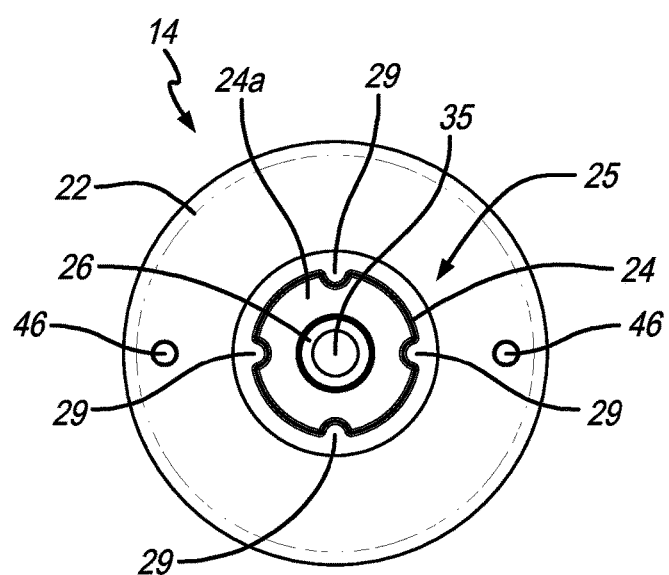
FIG. 6B is a top plan view of a spacer member.

The spacer member 14 generally includes a bonding member or base 22 with a post or extension member 24 extending therefrom. The extension member 24 includes first and second opposite ends 24a and 24b. The first end 24a includes a mounting guide 25 thereon. As is shown in FIGS. 6A-6B, the mounting member 12 includes guide members or protrusions 27 that mate with the mounting guide 25 on the spacer member 14 to properly align or orient the mounting member 12 and spacer member 14. The mounting guide 25 and guide member(s) 27 can be any mating or matching shape and either can be male or female. In another embodiment, the mounting member 12 and spacer member 14 can be permanently attached or unitary or can be adhered, glued, welded, snap fit, spring fit or otherwise secured together.

The mounting guide 25 is received in and/or aligned with the second connection opening 20 in the mounting member 12 and is secured therein. As discussed above, the mounting guide 25 can be any shape that mates with a complementary shape in the base of the mounting member 12 and helps align the spacer member 14 and the mounting member 12. In a preferred embodiment, the first end 24a of the extension portion 24 includes at least one and preferably a plurality of recesses 29 defined therein that are part of elongated channels 31 defined longitudinally in the extension member 24 and the base 15 of the mounting member 12 includes at least one and preferably a plurality of complementary protrusions or guide members 27 that are received in the recesses 29. The configuration of the mounting guides 25 (recesses 29) and guide members/protrusions 27 allow the mounting member 12 to be rotated in 90 degree increments with respect to the spacer member 14.

Figure 5A:
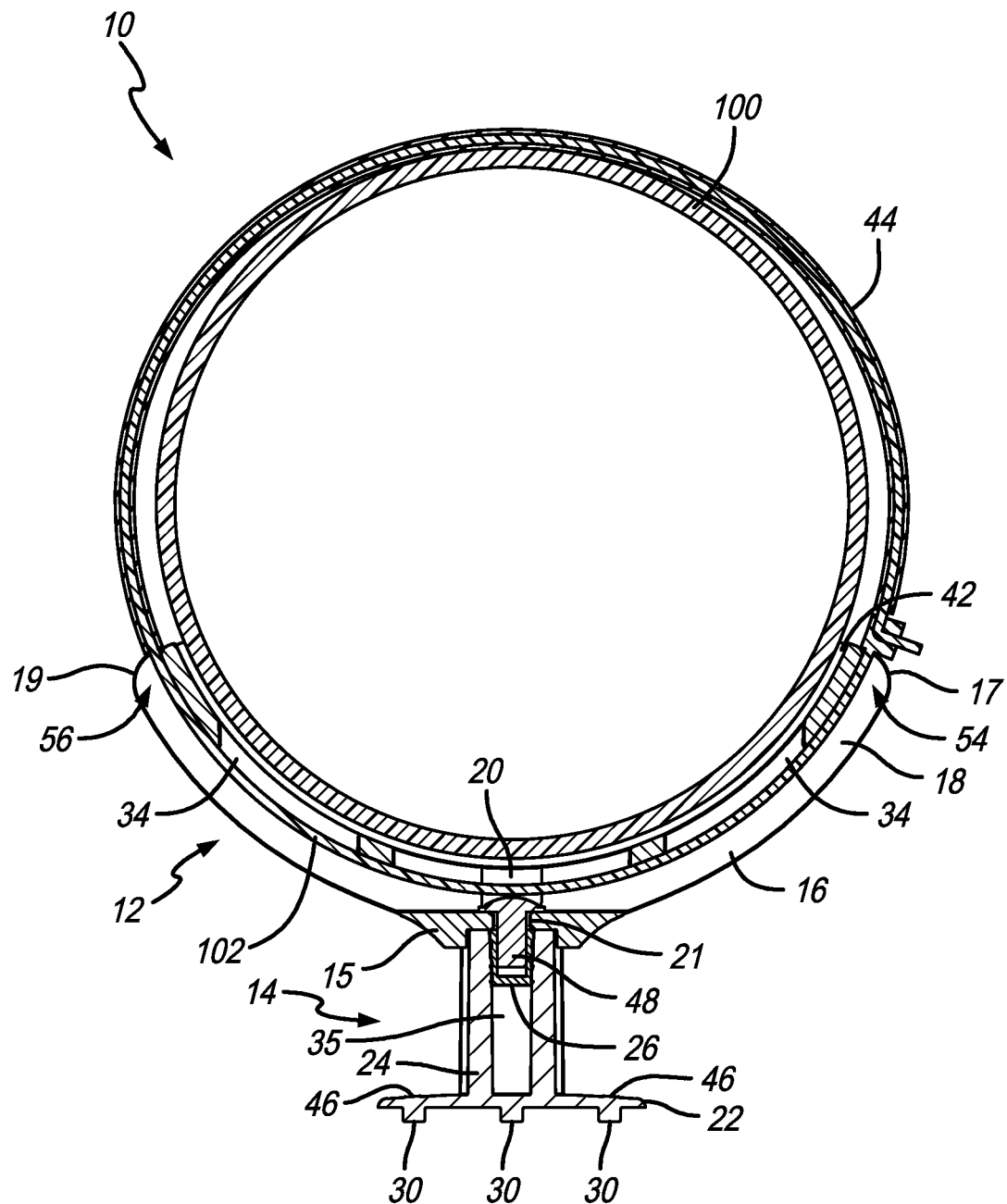
FIG. 5A is a cross-sectional view of the hose mounting assembly of FIG. 4 with a hose therein.
Figure 5B:
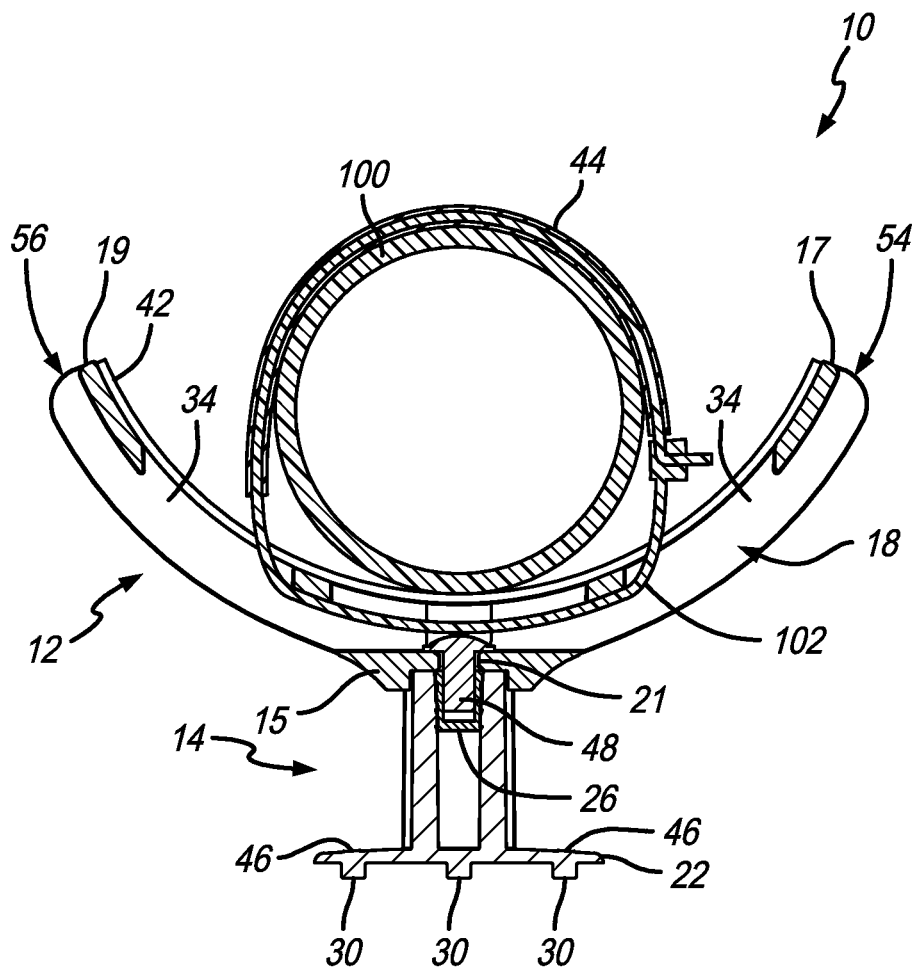
FIG. 5B is a cross-sectional view of the hose mounting assembly of FIG. 4 with a small hose therein.
Figure 9:
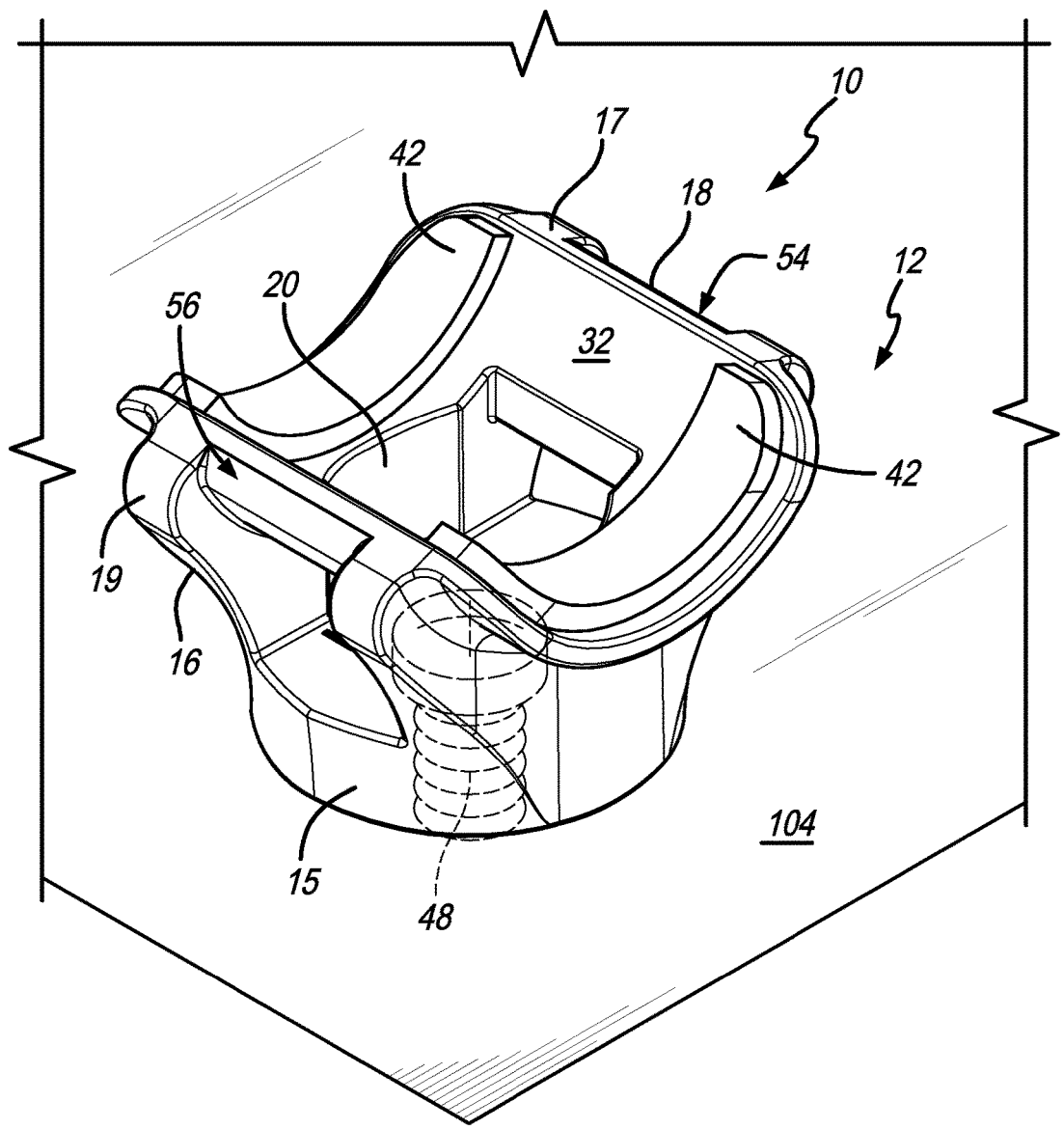
FIG. 9 is a perspective view of a hose mounting assembly connected to a panel.

In a preferred embodiment, the first end 24a of the extension portion 24 includes a mounting opening 35 defined therein that is coaxial with the first connection opening 21 and the second connection opening 20. Preferably, the mounting opening 35 includes an insert 26 therein that receives a fastener 48 (e.g., a threaded fastener, such as a screw). As shown in FIGS. 5A-5B, to connect the mounting member 12 to the spacer member 14, the fastener 48 is inserted through the second connection opening 20, and into the first connection opening 21 and the insert 26 (or just the mounting opening 35). The three aligned openings are referred to herein as the connection path. In another embodiment, the fastener 48 can extend first through the spacer member 14 and into the mounting member 12. In an embodiment without the spacer member 14, the fastener 48 connects the mounting member 12 directly to the wall, panel substrate or other object (as shown in FIG. 9).

Figure 7A:
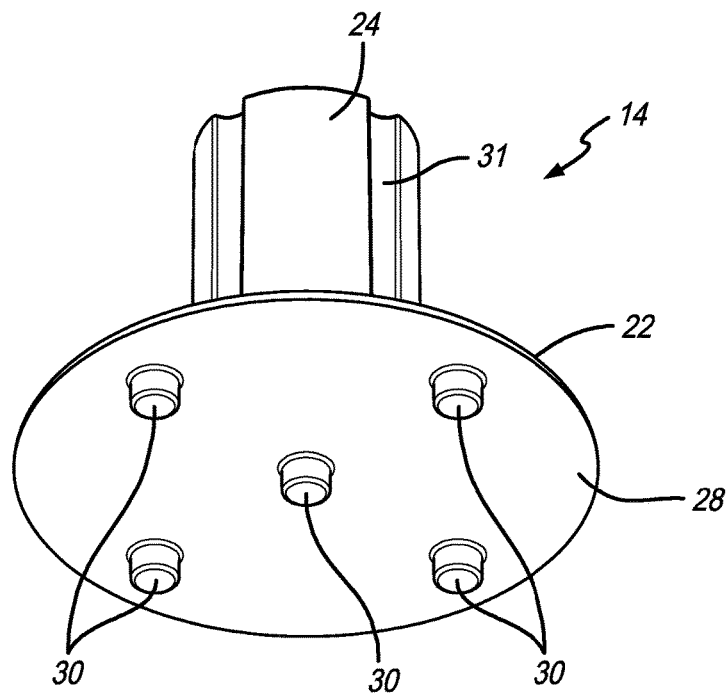
FIG. 7A is a bottom perspective view of a spacer member.
Figure 7B:
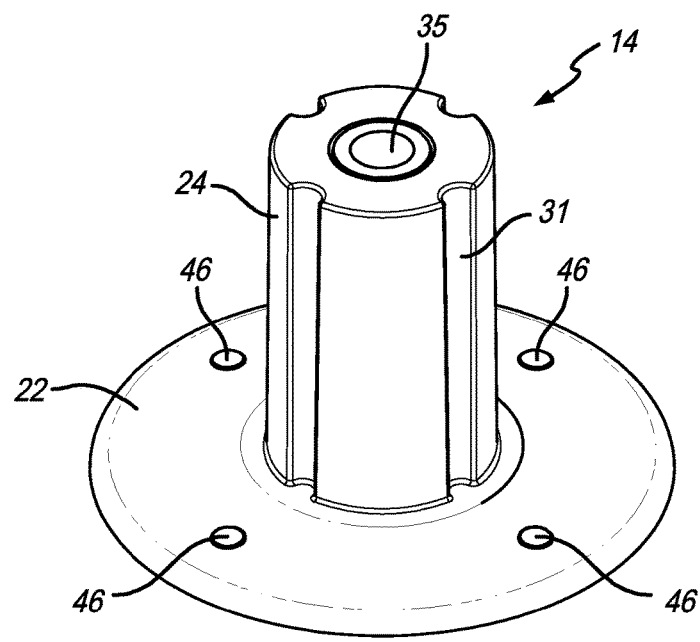
FIG. 7B is a top perspective view of a spacer member.

As is best shown in FIGS. 7A-7B, in a preferred embodiment, the base 22 is a disc or other shaped member that includes a surface 28 that is bonded to the surface of a monument, panel or the like. Preferably, the surface 28 includes alignment protrusions 30 extending therefrom that are received in openings in the panel or monument surface. The protrusions 30 are formed in a specific pattern so that they can be matched up with the proper openings in the panel. This helps the person installing the assembly 10 to properly orient or align the assembly 10. In a preferred embodiment, the base 22 of the spacer member 14 also includes installation guide markers 46 (they can be a protrusion, indentation or other mark) on an upper surface 52 thereof. Each installation guide marker 46 is coaxial with an alignment protrusion 30 along an axis that is parallel to the longitudinal central axis of the extension member 24. This provides the installer with a visual guide of where to place the installation guide pins or alignment protrusions 30.

FIG. 8 shows various alignment protrusion 30 patterns that can be used. These are not a limitation on the present invention. The various patterns facilitate manufacturing as substrates/panels will have the proper holes patterns pre-routed therein. It will be appreciated that the base 22 has the same patterned installation guide markers on the top thereof.

In a preferred embodiment, the mounting member 12 and spacer member 14 are made of nylon or other plastic. Preferably, the hose contact or mounting surface 32 has one or more co-molded strips of rubber or mounting guides 42 to provide protection against shaving. Preferably, the fastener 48 is recessed from the mounting surface 32 and tie tunnel 18 so the tie member 102 is clear of interference.

In use, after the mounting assembly 10 has been bonded to the panel, as is best shown in FIG. 1, a hose 100 is placed or received against the mounting guides 42 or mounting surface 32 and a tie member 102 is run or moved through the tie tunnel 18. As shown in FIG. 5A, in a preferred embodiment, the tie tunnel 18 extends from a first end opening 54 in the first end 17 of the main body portion 16 to a second end opening 56 in the second end. A first tie path is defined from the first end opening 54, through the tie tunnel 18 and to and through the second end opening 56. The tie member 102 is placed around the hose 100 and the opposite ends 102a and 102b are secured to one another so that the hose 100 is held against the mounting surface 32 (or mounting guides 42).

In some size mounting members 12, as shown in FIG. 5B, first and second tie openings 34 that extend through the mounting surface 32 and are in communication with the tie tunnel 18 can be formed in the main body portion 16. The tie openings 34 can serve multiple purposes. First, they reduce the weight of the mounting member 12. They also help seat a hose 100 (along with the rectangular central opening) that is secured therein. In another embodiment, as shown in comparing FIGS. 5A and 5B, the tie openings 34 allow the same mounting member 12 to a hose with a smaller diameter. In other words, the tie member 102 does not run all the way under the mounting surface 32 from end to end of the tie tunnel 18, but instead runs under the mounting surface 32 in the central portion of the main body portion 16 and then extends up through the tie openings 34 and around the hose. Therefore, a second tie path is defined in through the first tie opening 34, through a portion of the tie tunnel 18 and out through the second tie opening 34.

It will be appreciated that the purposes of the spacer member 14 is to space the hose from the panel when necessary. In some embodiments or uses the spacer member 14 can be omitted and the mounting member 12 can be mounted directly to the panel, as shown in FIG. 9. As shown in the figures, in an embodiment, a rubber sleeve 44 (or other material) can be placed around the tie member 102 to increase the grip around the hose and prevent the hose from being crushed. In another embodiment, the sleeve 44 can be omitted.

It will also be appreciated that different spacer members 14 can be made with different length extension portions 24. Furthermore, different sized mounting members 12 can be made for different sized hoses. In a preferred embodiment, a series of different sized (length) spacer members 14 and a series of different sized mounting members 12 can be sold together as a kit. This will allow the accommodation of different sized hoses and different spacings away from the panel.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed, at different times. Further any specific numbers noted herein are only examples: alternative implementations may employ differing values or ranges.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges. It will be appreciated that any dimensions given herein are only exemplary and that none of the dimensions or descriptions are limiting on the present invention.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for"). Accordingly, the applicant reserves the right to add additional claims after filing the application to pursue such additional claim forms for other aspects of the disclosure.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A hose mounting assembly comprising:
   a mounting member that includes a base and a main body portion, wherein the main body portion includes first and second ends, a curved tie tunnel defined therethrough, and a curved mounting surface, and wherein the base includes a first connection opening defined therethrough, and
   a spacer member that includes a base and an extension portion having first and second ends, wherein the base of the mounting member is secured to the first end of the extension portion.

2. The hose mounting assembly of claim 1 wherein the first end of the extension portion includes a mounting opening defined therein that is coaxial with the first connection opening, and wherein a fastener is received in the first connection opening and the mounting opening to secure the mounting member to the spacer member.

3. The hose mounting assembly of claim 2 wherein the first end of the extension portion includes one of a first protrusion and a first recess and the base of the mounting member includes the other of the first protrusion and the first recess, and wherein the first protrusion is received in the first recess.

4. The hose mounting assembly of claim 3 wherein the first recess is defined in the first end of the extension portion, wherein the first recess is part of an elongated channel defined longitudinally in the extension portion.

5. The hose mounting assembly of claim 1 wherein the base of the spacer member includes at least a first alignment protrusion extending from a bottom surface thereof.

6. The hose mounting assembly of claim 5 wherein the base of the spacer member includes at least a first installation guide protrusion on an upper surface thereof, wherein the extension portion defines a longitudinal central axis and wherein the first installation guide protrusion is coaxial with the first alignment protrusion along an axis that is parallel to the longitudinal central axis.

7. A hose mounting assembly comprising:
   a mounting member that includes a base and a main body portion, wherein the main body portion includes first and second ends, a curved tie tunnel defined therethrough, and a curved mounting surface, and wherein the base includes a first connection opening defined therethrough,
   a spacer member that includes a base and an extension portion having first and second ends, wherein the base of the mounting member is secured to the first end of the extension portion, and
   a tie member extending through at least a portion of the tie tunnel, wherein the tie member has first and second ends that are connected to one another outside of the tie tunnel.

8. The hose mounting assembly of claim 7 wherein the main body portion includes a second connection opening defined therethrough that is coaxial with the first connection opening, such that a connection path is defined from the mounting surface, through the main body portion, through the base and through a bottom surface of the base.

9. The hose mounting assembly of claim 8 wherein the tie tunnel extends from a first end opening in the first end to a second end opening in the second end.

10. The hose mounting assembly of claim 9 wherein the main body portion includes first and second tie openings defined therein that communicate the tie tunnel with the mounting surface, wherein a first tie path is defined in through the first end opening, through the tie tunnel and out through the second end opening, wherein a second tie path is defined in through the first tie opening, through a portion of the tie tunnel and out through the second tie opening.

11. The hose mounting assembly of claim 8 wherein the first end of the extension portion includes a mounting opening defined therein that is coaxial with the first connection opening, and wherein a fastener is received in the first connection opening and the mounting opening to secure the mounting member to the spacer member.

12. The hose mounting assembly of claim 11 wherein the first end of the extension portion includes one of a first protrusion and a first recess and the base of the mounting member includes the other of the first protrusion and the first recess, and wherein the first protrusion is received in the first recess.

13. The hose mounting assembly of claim 12 wherein the first recess is defined in the first end of the extension portion, wherein the first recess is part of an elongated trough defined longitudinally in the extension portion.

14. The hose mounting assembly of claim 7 wherein the base of the spacer member includes at least a first alignment protrusion extending from a bottom surface thereof.

15. The hose mounting assembly of claim 14 wherein the base of the spacer member includes at least a first installation guide protrusion on an upper surface thereof, wherein the extension portion defines a longitudinal central axis and wherein the first installation guide protrusion is coaxial with the first alignment protrusion along an axis that is parallel to the longitudinal central axis.

* * * * *